(12) United States Patent
Sanders

(10) Patent No.: US 12,598,076 B2
(45) Date of Patent: *Apr. 7, 2026

(54) METHOD FOR DERIVING A PARTIAL SIGNATURE WITH PARTIAL VERIFICATION

(71) Applicant: ORANGE, Issy les Moulineaux (FR)

(72) Inventor: Olivier Sanders, Chatillon (FR)

(73) Assignee: ORANGE, Issy les Moulineaux (FR)

( * ) Notice: Subject to any disclaimer, the term of this patent is extended or adjusted under 35 U.S.C. 154(b) by 84 days.

This patent is subject to a terminal disclaimer.

(21) Appl. No.: 17/928,064

(22) PCT Filed: May 31, 2021

(86) PCT No.: PCT/FR2021/050983
§ 371 (c)(1),
(2) Date: Nov. 28, 2022

(87) PCT Pub. No.: WO2021/240120
PCT Pub. Date: Dec. 2, 2021

(65) Prior Publication Data
US 2023/0198778 A1    Jun. 22, 2023

(30) Foreign Application Priority Data

May 29, 2020    (FR) ...................................... 2005704

(51) Int. Cl.
*H04L 9/32* (2006.01)
*H04L 9/14* (2006.01)
*H04L 9/30* (2006.01)
(52) U.S. Cl.
CPC .............. *H04L 9/3247* (2013.01); *H04L 9/14* (2013.01); *H04L 9/3066* (2013.01); *H04L 9/3239* (2013.01)

(58) Field of Classification Search
CPC ....... H04L 9/3247; H04L 9/14; H04L 9/3066; H04L 9/3239
See application file for complete search history.

(56) References Cited

U.S. PATENT DOCUMENTS

| | | | |
|---|---|---|---|
| 7,093,133 B2 | 8/2006 | Hopkins et al. | |
| 11,870,913 B2 * | 1/2024 | Gouget ................... | H04L 9/004 |

(Continued)

FOREIGN PATENT DOCUMENTS

EP        2871801 A1      5/2015

OTHER PUBLICATIONS

English translation of the Written Opinion of the International Searching Authority dated Sep. 22, 2021 for corresponding International Application No. PCT/FR2021/050983, filed May 31, 2021.

(Continued)

*Primary Examiner* — Cheng-Feng Huang
(74) *Attorney, Agent, or Firm* — David D. Brush; Westman, Champlin & Koehler, P.A.

(57)        ABSTRACT

A method for deriving a partial signature for a subset of a set of messages. The method includes: receiving the set of messages and a signature of the set, which includes signature elements of the set; generating anonymized elements of the signature; generating a first verification element from messages other than those of the subset; generating a second verification element to prove the first verification element is well formed; and sending, to a verification entity, a partial signature specific to the subset. The partial signature includes a constant number of elements having at least the elements of the signature of the set of anonymized messages, the first verification element and the second verification element. The partial signature is verifiable with only the messages of the subset of messages. The second verification (Continued)

element is a function of derived values calculated from at least the other elements of the partial signature.

13 Claims, 2 Drawing Sheets

(56) References Cited

U.S. PATENT DOCUMENTS

| | | | | |
|---|---|---|---|---|
| 2002/0152389 A1* | 10/2002 | Horita | ................... | H04L 9/0836 |
| | | | | 713/180 |
| 2003/0120931 A1 | 6/2003 | Hopkins et al. | | |
| 2008/0095360 A1 | 4/2008 | Vuillaume et al. | | |
| 2009/0193256 A1 | 7/2009 | Takenaka et al. | | |
| 2010/0153712 A1* | 6/2010 | Gentry | .................. | H04L 9/3073 |
| | | | | 380/47 |
| 2022/0173914 A1* | 6/2022 | Gouget | ................... | H04L 9/004 |
| 2023/0308289 A1* | 9/2023 | Yavuz | ................... | H04L 9/3234 |

OTHER PUBLICATIONS

International Search Report dated Sep. 22, 2021 for corresponding International Application No. PCT/FR2021/050983, filed May 31, 2021.

Written Opinion of the International Searching Authority dated Sep. 22, 2021 for corresponding International Application No. PCT/FR2021/050983, filed May 31, 2021.

French Search Report dated Feb. 8, 2021 for corresponding French Application No. 2005704, filed May 29, 2020.

Sanders Olivier, "Efficient Redactable Signature and Application to Anonymous Credentials", Apr. 29, 2020 (Apr. 29, 2020), Lecture Notes in Computer Science, Springer Berlin Heidelberg, Berlin Germany, pp. 628-656, XP047549945.

Kristian L Mcdonald, "The Landscape of Pointcheval-Sanders Signatures: Mapping to Polynomial-Based Signatures and Beyond", vol. 20200420:093243, Apr. 17, 2020 (Apr. 17, 2020), p. 1-74, IACR, International Association for Cryptologic Research, Retrieved from the Internet: URL:http://eprint.iacr.org/2020/450.pdf XP061035728.

Stuart Haber et al., "Efficient Transparent Redactable Signatures with a Single Signature Invocation", IACR, International Association for Cryptologic Research, vol. 20161228:140649, Dec. 20, 2016 (Dec. 20, 2016), p. 1-20, XP061022352.

U.S. Patent Office issued prosecution for U.S. Appl. No. 17/768,114, filed Apr. 11, 2022, including: Non-Final Rejection issued Jun. 9, 2025, 37 pages; Advisory Action issued Feb. 18, 2025, 3 pages; Final Rejection issued Oct. 29, 2024, 26 pages; Non-Final Rejection issued Mar. 27, 2024, 20 pages; 86 pages total.

International Search Report dated Nov. 6, 2020 for corresponding International Application No. PCT/FR2020/051748, Oct. 6, 2020.

Written Opinion of the International Searching Authority dated Nov. 6, 2020 for corresponding International Application No. PCT/FR2020/051748, filed Oct. 6, 2020.

Dae Hyun Yum and Pil Joong Lee, "Sanitizable Signatures Reconsidered", Feb. 1, 2011 (Feb. 1, 2011), vol. E94A, No. 2, p. 717-724, XP001560958.

Pointcheval David et al., "Short Randomizable Signatures", Feb. 2, 2016 (Feb. 2, 2016), International Conference on Financial Cryptography and Data Security; [Lecture Notes in Computer Science; Lect.Notes Computer], Springer, Berlin, Heidelberg, pp. 111-126, XP047335443.

French Search Report dated May 27, 2020 for corresponding French Application No. 1911300, filed Oct. 11, 2019.

English translation of the Written Opinion of the International Searching Authority dated Nov. 16, 2020 for corresponding International Application No. PCT/FR2020/051748, filed Oct. 6, 2020.

Camenisch et al., "Composable and Modular Anonymous Credentials: Definitions and Practical Constructions", International Association for Cryptologic Research 2015, ASIACRYPT 2015, Part II, LNCS 9453, pp. 262-289, DOI: 10.1007/978-3-662-48800-3_11.

Fuchsbauer et al., "Structure-Preserving Signatures on Equivalence Classes and Constant-Size Anonymous Credentials", Journal of Cryptology (2019) 32:498-5462019, https://doi.org/10.1007/s00145-018-9281-4.

Office Action mailed Feb. 2, 2026, for U.S. Appl. No. 17/768,114, 48 pages.

* cited by examiner

[Fig 1]
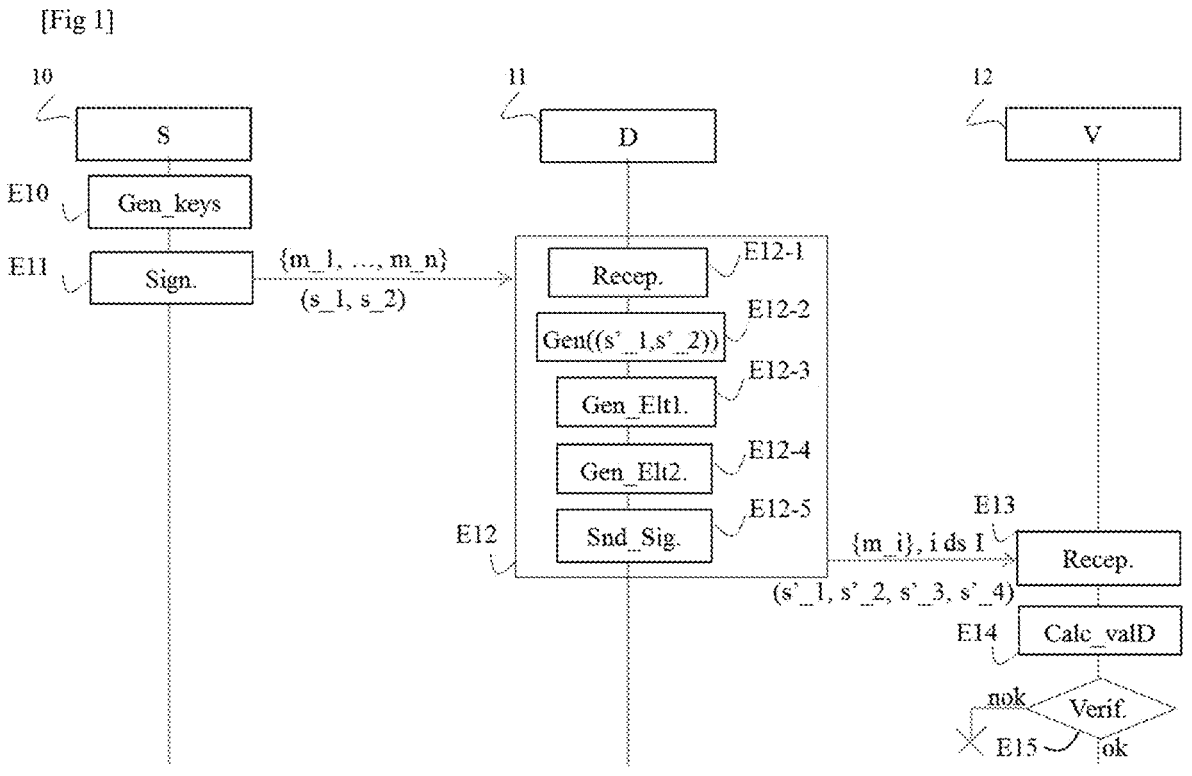
[Fig 2]
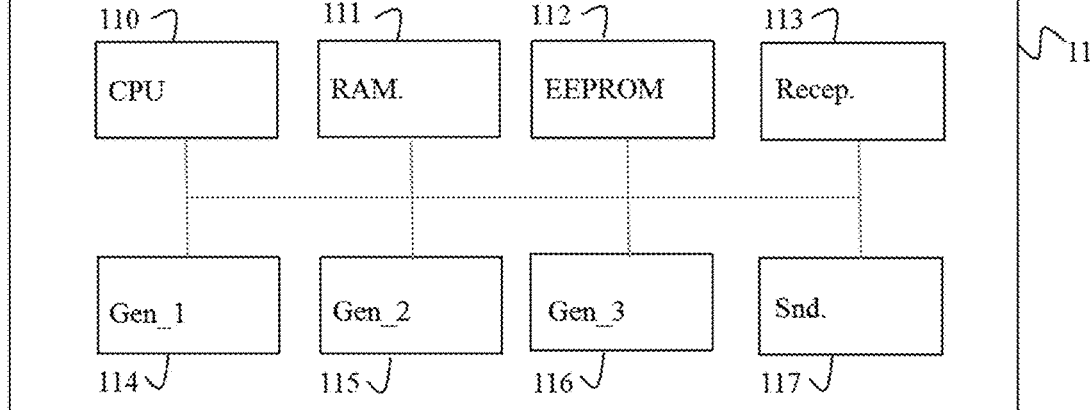

[Fig 3]
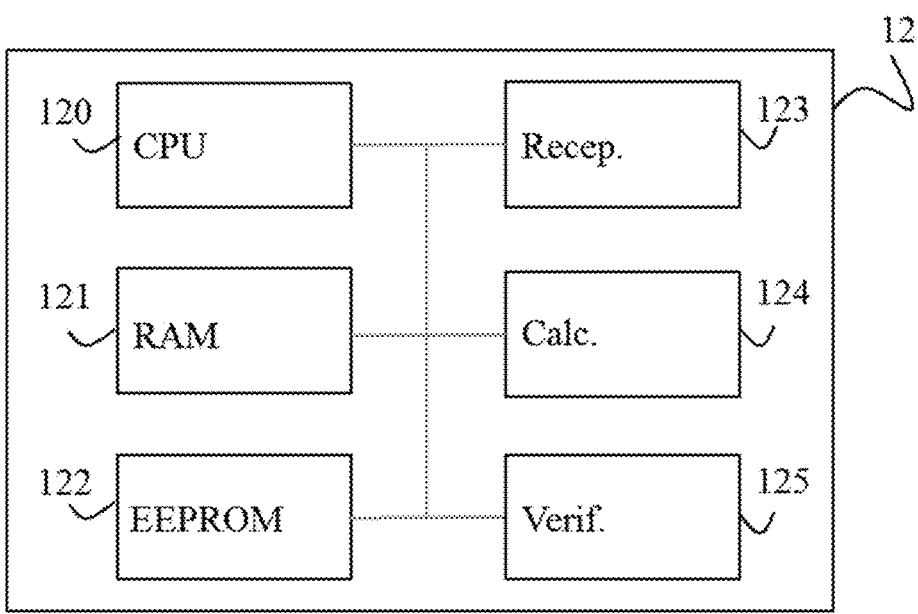

METHOD FOR DERIVING A PARTIAL SIGNATURE WITH PARTIAL VERIFICATION

CROSS-REFERENCE TO RELATED APPLICATIONS

This Application is a Section 371 National Stage Application of International Application No. PCT/FR2021/050983, filed May 31, 2021, which is incorporated by reference in its entirety and published as WO 2021/240120 A1 on Dec. 2, 2021, not in English.

The present invention relates to the general field of telecommunications and more specifically concerns the securing of the exchanges between communication devices using cryptographic techniques such as electronic signature techniques.

BACKGROUND OF THE DISCLOSURE

The electronic signature is a cryptographic tool that allows authenticating any digital data, thus acting as the equivalent of a traditional handwritten signature. This technique is ubiquitous in our daily lives and has led to a profusion of work in cryptography around the notion of anonymous authentication, where the goal is to reduce the information revealed during each authentication to the strict minimum. Some technologies resulting from this work are now widely deployed, for example in most laptop computers, under the name of DAA (Direct Anonymous Attestation) or in some processors under the name of EPID (Enhanced Privacy IDentity).

Electronic signature mechanisms are essentially behind this work. This type of algorithm takes as input a set of n messages and returns a publicly verifiable signature by anyone with knowledge of a public key corresponding to the private key used by the signatory to sign the messages. The difficulty in the context of the anonymous authentication is that messages irrelevant for the authentication must be "concealed" by means of proofs of knowledge, which is a relatively expensive cryptographic technique. In the example of a digital passport, the set of attributes, such as the first name, the last name, the date of birth, the physical characteristics, etc. is signed by a passport—issuing authority. If it is necessary to prove that a certain age criterion is met, for example an age strictly over 18 years, any information other than the date of birth becomes "useless" and must therefore be hidden to preserve the privacy of the users. This means that it will be necessary to produce proofs of knowledge of n−1 data other than the date of birth. However, this turns out to be much too costly from an efficiency point of view: cost of communication of a lot of data to allow the calculation of the proofs, time needed to calculate these proofs.

During the PKC 2020 conference, a new electronic signature mechanism solving these problems was published: "Efficient Redactable Signature and Application to Anonymous Credentials", Olivier Sanders. This mechanism allows the holder of a signature on n attributes to derive a partial signature on any subset of these n attributes. The derived signature thus obtained is of constant size and can be verified with a complexity depending only on the size of the derivation subset. Returning to the previous example on the attributes of a passport, it is possible by using this algorithm to derive a signature only on the date of birth of the user, this signature can then be verified with essentially a single exponentiation. However, these properties are possible at the price of a relatively large-sized public key. Indeed, it contains about n^2 (or $n^2$) elements for a system supporting n attributes. This can be prohibitive for large values of n: transmission of the public key to the stakeholders, volume required to store this public key, complexity of the initial calculation of the key.

SUMMARY

One of the aims of the invention is to overcome shortcomings/disadvantages of the state of the art, and/or to make improvements thereto.

To this end, the invention proposes a method for deriving a partial signature for a subset of a set of messages, called subset of messages, said partial signature being intended to prove the validity of a signature of the set of messages for the messages of the subset of messages, said method, implemented by an entity for deriving a partial signature, comprising:

receiving of the set of messages and of a signature of said set of messages, said signature comprising signature elements of the set of messages, generation of anonymized elements of the signature, generation of a first verification element calculated from the messages of the set other than those of the subset of messages, and generation of a second verification element intended to prove that the first verification element is well formed, and sending, to a verification entity, of a partial signature specific to the subset of messages, said partial signature comprising a constant number of elements comprising at least the elements of the signature of the set of anonymized messages, the first verification element and the second verification element, said partial signature being intended to be verified with the only messages of the subset of messages, characterized in that the second verification element is a function of derived values calculated from at least the other elements of the partial signature.

The partial signature derivation method has the same advantages as the mechanism described in PKC 2020: the signature obtained is of constant size, regardless of the value of n and the size of the subset of messages, and it is not necessary to know the disregarded messages, that is to say those that are not part of the subset of messages, to verify the signature. Furthermore, the scheme offers all the usually expected security properties of this type of scheme, as well as the ability to prove relationships on the data.

The method of the present invention improves the efficiency of this mechanism with a public key of considerably reduced size, on the order of 3n elements. The complexity of the method is said to be linear while the complexity of the PKC 2020 mechanism is said to be quadratic (in n^2).

The number of elements of the public key is therefore drastically reduced and in order to avoid compensation phenomena where an attacker would cheat on some messages and compensate on others, a dose of unpredictability is introduced by means of the derived values which in practice will make any compensation attempt by the attacker impossible. The set of the derived values allows in a way to "freeze" the other values of the partial signature and thus constitutes a commitment of the signatory on these other values.

In one exemplary embodiment, let I be a subset of a set $\{1, \ldots, n\}$, n designating the maximum number of messages that can be signed at a time, the set of messages being denoted $\{m\_1, \ldots, m\_n\}$, let m_i be the messages of the subset of messages, i belonging to I, the calculation of the derived values of the second verification element comprises: for any i of I, the application of a function H taking as input any string of characters and returning a non-zero scalar, said function H being applied to the elements of the signature of the set of anonymized messages, to the first verification element, to the subset I and to i.

The function H allows calculating the derived values used in the calculation of the second verification element. It takes as input any string of characters and returns a non-zero scalar. It is understood that an attacker who would modify one or several of the other elements of the signature would not allow obtaining a positive verification of the partial signature. Indeed, the derived values calculated from modified values of the signature and/or compensated by modified values of the first and/or second verification element would then be necessarily different.

In one exemplary embodiment, the function H taking as input any string of characters and returning a non-zero scalar is a one-way function.

In this example, the function H is a one-way function, that is to say, a function that can be easily calculated but difficult to reverse. For example, the function H is a cryptographic hash function, such as SHA-256.

In one exemplary embodiment, the partial signature derivation method comprises beforehand a generation of a secret key and of an associated public key in a bilinear environment, said environment designating a first group G1, a second group G2 and a third group GT of order p, as well as a bilinear map e, taking as input an element of the first group G1, an element of the second group G2 and with values in the third group GT, let g, respectively h, be an element of the first group G1, respectively of the second group G2, said generation comprising:

a generation, by the signatory entity, of 2 random scalars a and b, said random scalars forming the secret key of the signatory entity, and a calculation by the signatory entity of:

$$G\_i = g\hat{} \{b\hat{} i\}, \text{ for any } 1 \leq i \leq n \text{ and } n+2 \leq i \leq 2n,$$

$$A = h\hat{} a, \text{ and}$$

$$B\_i = h\hat{} \{b\hat{} i\}, \text{ for any } 1 \leq i \leq n,$$

the public key (Kp) is formed of g, h, G_i, A, and B_i and of the function of calculating the derived values.

It is observed that the generation of the pair of keys Ks/Kp of the signatory requires the generation of only two scalars, a and b, the latter being involved at different powers in the elements of the public key. In the PKC 2020 mechanism, the signatory generated n+1 random scalars used in particular to build elements essential to the derivation of the signature but which weighed heavily on the size of the public key because they were $n\hat{}2-n$ (or $n^2-n$) in number. Hence the quadratic complexity mentioned earlier.

Thus, the public key used in the partial signature derivation method described here consists of only 2n elements of G1 and n+2 elements of G2. For the record, the public key of the PKC 2020 mechanism consists of $(n\hat{}2+n+2)/2$ (or $(n^2+n+2)/2$) elements of G1 and n elements of G2. The method of a partial signature therefore moves from a quadratic complexity to a linear complexity. A simple estimate for reasonable values of n, such as n=100, n=1,000, etc., shows the practical importance of this improvement. This improvement concerns the costs inherent in the transmission of the public key, in the storage of this public key for example.

In one exemplary embodiment, the signature of the set $\{1, \ldots, n\}$ of messages $\{m\_1, \ldots, m\_n\}$ comprises the selection by the signatory entity of a random element s_1 of the first group G1, and the calculation of:

$s\_2 = s\_1\hat{} \{a+b*m\_1+b\hat{}2*m\_2+ \ldots +b\hat{}n*m\_n\}$, said signature comprising the signature elements s_1, s_2, and being denoted (s_1, s_2).

In one exemplary embodiment, the derivation of the partial signature for the subset I of the set $\{1, \ldots, n\}$ of messages comprises:

calculation of the anonymized elements $((s'\_1, s'\_2))$ of the signature, said calculation comprising:

generation of a first random scalar t and of a second non-zero scalar r, anonymization of the first signature element and calculation of $s'\_1 = s'\_1\hat{} r$, anonymization of the second signature element and calculation of $s'\_2 = s'\_2\hat{} r*s'\_1\hat{} t$, generation of the first verification element $s'\_3 = \Pi\_\{j \text{ in } \{1, \ldots, n\} \setminus I\} B\_j\hat{} \{m\_j\}*h\hat{} t$, and generation of the second verification element $s'\_4 = \Pi\_\{i \text{ in } I\}(G\_\{n+1-i\}\hat{} t*\Pi\{j \text{ in } \{1, \ldots, n\} \setminus I\} G\_\{n+1-i+j\}\hat{} m\_j)\hat{} c\_i$, the partial signature then being (s'_1, s'_2, s'_3, s'_4).

It is observed that in this example where the calculations of the different elements of the partial signature are detailed, the first verification element is very similar, in its calculation, to an element of the partial signature of the PKC 2020 scheme. On the other hand, the calculation of the second verification element does not find its equivalent in the PKC 2020 mechanism, in particular because it is calculated from derived values. This difference is due to the use of less scalars compared to the other mechanism, which lead to fewer elements in the public key, but also to the adequate use of derived values mentioned above which allows reducing the number of elements of this public key while preserving the security of the method.

The invention also concerns a method for verifying a partial signature for a subset of a set of messages, called subset of messages, said partial signature being intended to prove the validity of a signature of the set of messages for the messages of the subset of messages, said method, implemented by an entity for verifying a partial signature, comprising:

receiving of the subset of messages and of a partial signature specific to the subset of messages, said partial signature comprising a constant number of elements comprising at least the anonymized elements of the signature of the set of messages, a first verification element calculated from the messages of the set other than those of the subset of messages and a second verification element intended to prove that the first verification element is well formed, the second verification element being a function of derived values from at least the other elements of the partial signature, calculation of the derived values by means of a function of calculating derived values, verification of a first equation and of a second equation, said first equation comprising the messages of the subset of messages, the elements of the signature of the set of messages, the first verification element and elements of the key public, the second equation comprising the first signature verification element, the second signature verification element, elements of the public key and the derived values.

The verification method described here is inseparable from the partial signature derivation method described above. Obviously, the use of derived values in the calculation of the partial signature is logically in the verification method which also stands out from the partial signature verification of the PKC 2020 mechanism.

In one exemplary embodiment of the partial signature verification method, a secret key and a public key have been previously generated in a bilinear environment for a signatory entity, said environment designating a first group G1, a second group G2 and a third group GT of order p, as well as a bilinear map e, taking as input an element of the first group G1, an element of the second group G2 and with values in the third group GT, let g, respectively h, be an element of the first group G1, respectively of the second group G2, said generation of the secret key and of the public key comprising:

generation, by the signatory entity, of 2 random scalars a and b, said random scalars forming the secret key of the signatory entity, and n designating the maximum number of messages that can be signed at a time, calculation by the signatory entity of:

$$G\_i = g^{\{b^i\}}, \text{ for any } 1 \leq i \leq n \text{ and } n+2 \leq i \leq 2n,$$

$$A = h^a, \text{ and}$$

$$B\_i = h^{\{b^i\}}, \text{ for any } 1 \leq i \leq n,$$

g, h, G_i, A, and B_i and the function of calculating derived values, denoted H, forming the public key, the verification of the partial signature, denoted $(s'\_1, s'\_2, s'\_3, s'\_4)$, received by the verification entity comprising for a subset I of a set $\{1, \ldots, n\}$, the set of messages being denoted $\{m\_1, \ldots, m\_n\}$, let $m\_i$ be the messages of the subset of messages:

calculation of the derived values:

$$c\_i = H(s'\_1 \| s'\_2 \| s'\_3 \| I \| i), \text{ for any subscript } i \text{ in } I,$$

verification of the first equation:

$$e(s'\_1, A^*(\Pi\_{\{i \text{ in } I\}} B\_i^{\{m\_i\}})^* s'\_3) = e(s'\_2, h), \text{ and}$$
of the second equation:

$$e(\Pi\_{\{i \text{ in } I\}} G\_{\{n+1-i\}}^{\{c\_i\}}, s'\_3) = e(s'\_4, h).$$

The invention also concerns an entity for deriving a partial signature intended to derive a partial signature for a subset of a set of messages, called subset of messages, said partial signature being intended to prove the validity of a signature of the set of messages for the messages of the subset of messages, said partial signature derivation entity, comprising:

receiving means, arranged to receive the set of messages and a signature of said set of messages, said signature comprising signature elements of the set of messages, first generation means, arranged to generate anonymized elements of the signature, second generation means, arranged to generate a first verification element calculated from the messages of the set other than those of the subset of messages, and third generation means, arranged to generate a second verification element intended to prove that the first verification element is well formed, and sending means, arranged to send to a verification entity a partial signature specific to the subset of messages, said partial signature comprising a constant number of elements comprising at least the elements of the signature of the set of anonymized messages, the first verification element and the second verification element, said partial signature being intended to be verified with the only messages of the subset of messages, characterized in that the second verification element is a function of derived values calculated from at least the other elements of the partial signature.

The invention also relates to an entity for verifying a partial signature, intended to verify a partial signature for a subset of a set of messages, called subset of messages, said partial signature being intended to prove the validity of a signature of the set of messages for the messages of the subset of messages, said partial signature verification entity comprising:

first receiving means, arranged to receive the subset of messages and a partial signature specific to the subset of messages, said partial signature comprising a constant number of elements comprising at least the anonymized elements of the signature of the set of messages, a first verification element calculated from the messages of the set other than those of the subset of messages and a second verification element intended to prove that the first verification element is well formed, the second verification element being a function of derived values from at least the other elements of the partial signature, calculation means, arranged to calculate derived values by means of a function of calculating derived values, verification means, arranged to verify a first equation and a second equation, said first equation comprising the messages of the subset of messages, the elements of the signature of the set of messages, the first verification element and elements of the public key, the second equation comprising the first signature verification element, the second signature verification element, elements of the public key and the derived values.

The invention also concerns a partial signature derivation and verification system comprising:

an entity for deriving a partial signature as described above, an entity for verifying a partial signature as described above.

The invention also relates to a use of a partial signature derivation and verification system as described above in an anonymous credential system.

The invention also concerns a computer program on a data medium and loadable into the memory of a computer, comprising program code instructions intended to control the execution of the steps of the partial signature derivation method as previously described, when the program is executed on said computer.

The invention also concerns a data medium in which the previous program is recorded.

The invention also relates to a computer program on a data medium and loadable into the memory of a computer, comprising program code instructions intended to control the execution of the steps of the partial signature verification method introduced previously, when the program is executed on said computer.

The invention also relates to a data medium in which the program above is recorded.

BRIEF DESCRIPTION OF THE FIGURES

Other characteristics and advantages of the present invention will be better understood from the detailed description and the appended figures, among which:

FIG. 1 presents the steps of a method for deriving a partial signature and verifying the partial signature for a subset of a set of messages, according to one exemplary embodiment;

FIG. 2 is a schematic representation of an entity for deriving a partial signature able to implement the steps of the partial signature derivation method for a subset of messages, according to one exemplary embodiment;

FIG. 3 is a schematic representation of an entity for verifying a partial signature able to implement the steps of the partial signature verification method for a subset of messages, according to one exemplary embodiment.

DETAILED DESCRIPTION

The steps of a partial signature derivation and associated verification method for a subset of a set of messages, called subset of messages, according to one exemplary embodiment, will now be described in relation to FIG. 1.

It is noted that a usual notation in cryptography is used here in which:

"x_i" represents "x subscript i", namely "$x_i$";

"g^x" represents "g power x", namely "$g^x$", the product is schematized by an asterisk: "*", or by the classic sign Π (capital pi) when many indexed factors are involved. A notation where the asterisk is absent is also possible: "2n" for "2*n", the addition is classically schematized by the sign "+", or by the sign Σ (capital sigma) when many indexed factors are involved.

The signature scheme described here operates in a bilinear environment which designates three groups, usually denoted G1, G2 and GT, of order p, as well as a bilinear map e called "bilinear coupling" taking as input an element of the group G1 and an element of the group G2 and with values in the group GT. This type of environment has become classic in cryptography and can be implemented very efficiently. It should be noted that the roles of G1 and G2 are perfectly interchangeable. Moreover, the term "scalar" here designates any integer comprised between 0 and p−1, p being the order of the groups mentioned above.

The signature scheme is based on a system that comprises several entities:

a signatory entity 10. The signatory entity 10 is a computing device which comprises code instructions to implement those of the steps of the partial signature derivation method implemented by the signatory entity 10, an entity 11 for deriving a partial signature. The partial signature derivation entity 11 is a computing device which comprises code instructions for implementing those of the steps of the partial signature derivation method implemented by the partial signature derivation entity 11, an entity 12 for verifying a partial signature. The partial signature verification entity 12 is a computing device which comprises code instructions to implement those of the steps of the partial signature derivation method implemented by the partial signature verification entity 12.

It is noted that the same entity can combine several roles. For example, a signatory entity can also act as a partial signature derivation entity. Similarly, a signatory entity can also be caused to act as a partial signature verification entity.

For the record, a bilinear coupling e is a function verifying among others the following properties:

$$e(g^a, h^b) = e(g,h)^{(a \cdot b)}$$

$$e(g^a, q) = e(g,g)^a = e(g,q^a)$$

In the following, n designates the maximum number of data that can be signed at a time. Thereafter, a classic notation in cryptography is used and it is referred to as "messages" rather than "data". Thus, a set $\{1, \ldots, n\}$ of messages to be signed, denoted $\{m\_1, \ldots, m\_n\}$ is provided. For example, for an individual, such messages may be their name, address, date of birth, etc.

In a prior key generation step E10, the signatory entity 10 generates for the signature scheme, a pair of secret/public keys Ks/Kp. It should be noted that in another exemplary embodiment, the generation of keys can be implemented by a dedicated key generation entity, distinct from the signatory entity 10, the keys, and in particular the secret key then being transmitted to the signatory entity 10 in a secure manner, according to the known methods not presented here.

Let g, respectively h, be a random element of the group G1, respectively of the group G2, the signatory entity 10 controls the generation of two scalars a and b and calculates the following elements:

$$G\_i = g^{\{b^i\}}, \text{ for } 1 \le i \le n \text{ and } n+2 \le i \le 2n$$

$$A = h^a$$

$$B\_i = h^{\{b^i\}}, \text{ for } 1 \le i \le n$$

The public key Kp is formed of the elements g, h, A, B_i and G_i, for the subscripts mentioned above. The public key also defines a function, denoted H, intended to freeze the data to which it applies. More specifically, applying the function H to data produces a commitment on these data. The function H takes as input any string of characters and returns a non-zero scalar. In one exemplary embodiment, the function H is a one-way function. For the record, a one-way function is a function that can be easily calculated but difficult to reverse. In another exemplary embodiment, the function H is a cryptographic hash function, such as SHA-256 (Secure Hash Algorithm).

The secret key Ks of the signatory in the signature system consists only of the scalars a, b.

Thus:

$$Ks = (a,b), \text{ and}$$

$$Kp = (g,h,A,B\_i,G\_i,H)$$

Conventionally, the public key Kp is then published or transmitted, here by the signatory entity 10. It should be noted that the cost inherent in this publication or this transmission is considerably reduced, in particular compared to the solution described in PKC 2020: "Efficient Redactable Signature and Application to Anonymous Credentials", Olivier Sanders, due to the size of the public key Kp. In this exemplary embodiment, the public key Kp is indeed made up of 2n elements of G1 and n+2 elements of G2, against $(n^2+n+2)/2$ elements for the protocol described in PKC 2020. An estimate for reasonable values of n such as n=100, n=1,000, . . . , shows the practical importance of this improvement, in particular for the transmission and/or the storage of the public key. This is known as linear complexity, or "in n" for the present solution against a quadratic complexity, or in "$n^2$" for the mechanism presented at PKC 2020.

The signature scheme described here thus allows very effectively verifying the validity of a signature on any subset of messages. This efficiency is based in particular on the public key whose number of elements is drastically reduced compared to the mechanism described at PKC 2020.

In a second signature step E11, the signatory entity 10 signs the n messages m\_1, . . . , m\_n by means of its secret key Ks. To this end, the signatory entity 10 selects a random element s_1 from the group G1 and generates a second element s_2 as follows:

$$s\_2 = s\_1\hat{}\{a + b^* m\_1 + b\hat{}2^* m\_2 + \ldots + b\hat{}n^* m\_n\}$$

The signature of the set of n messages is then (s_1, s_2).

It is noted that the signatory entity 10 can also sign messages of size n', with n'<n with this same pair of keys, that is to say, without regenerating a pair of keys. In this case, the message of size n' to be signed is completed with '0's until obtaining a message of size n, and the signatory entity 10 then uses its pair of keys Ks/Kp to sign it. At the end of the signature step E11, the signatory entity 10 sends the signature (s_1, s_2) of the set of n messages to the partial signature derivation entity 11 as well as the set of n messages {m_1, . . . , m_n}.

The partial signature derivation entity 11 receives, in a substep E12-1 of receiving a step E12 of deriving a partial signature, the signature (s_1, s_2) of this set of n messages as well as the set of n messages {m_1, . . . , m_n}. The step E12 of deriving a partial signature allows deriving from the signature on the n messages received during the step E12-1, a signature subsequently called "partial signature" on any subset of the n messages. The set of subscripts of the messages of this subset is designated by I in the following.

The partial signature derivation entity 11 generates, in a sub-step E12-2 of generating the anonymized elements of the signature (the term "randomized" is used), a scalar t, potentially equal to 0, as well as a non-zero random scalar r. The scalars t and r are intended to anonymize the signature. The derivation entity 11 then calculates a first and a second anonymized element of the signature:

$$s'\_1 = s\_1\hat{}r$$

$$s'\_2 = s\_2\hat{}r^* s'\_1\hat{}t$$

In a sub-step E12-3 of generating a first verification element, the entity 11 calculates a third element of the signature:

$$s'\_3 = \Pi\_\{j \text{ in } \{1, \ldots, n\} \backslash I\} B\_j\hat{}\{m\_j\} ^* h\hat{}t$$

This third element of the signature s'_3 constitutes a first partial signature verification element.

It is observed that all the subscripts of the product forming this first verification element s'_3 are all the elements of {1, . . . , n} that are not in I.

In a next step E12-4 of generating a second signature verification element, the entity 11 calculates a fourth element of the signature s'_4. To this end, the entity 11 calculates derived values $c_i$ as follows:

$c_i = H(s'\_1 \| s'\_2 \| s'\_3 \| I \| i)$, for all i in I. The symbol "$\|$" designates the concatenation of strings of characters. By definition of the function H, each of the elements $c_i$ is a non-zero scalar. The values $c_i$, obtained by applying the function H, constitute derived values of the elements of the signature s'_1, s'_2 and s'_3. The derived values somehow freeze the elements of the signature. They are intended to avoid phenomena called "compensation" phenomena, where an adversary would cheat on some messages but would manage to compensate on other messages. These derived values are intended to counteract the simplicity of the public key that uses fewer scalars, thus leading to fewer elements in the public key.

The derivation entity 11 then calculates the fourth element of the partial signature s'_4:

$$s'\_4 = \Pi\{i \text{ in } I\}(G\_\{n+1-i\}\hat{}r^* \Pi\_\{j \text{ in } \{1, \ldots, n\} \backslash I\}$$
$$(G\_\{n+1-i+j\}\hat{}m\_j))\hat{}c\_i$$

This fourth element of the signature s'_4 constitutes the second partial signature verification element.

The partial signature is then (s'_1, s'_2, s'_3, s'_4).

The partial signature is specific to the messages $m_i$, with i in I and is intended to be used to verify the validity of the signature of this subset of messages $m_i$ based on the signature of the n messages (s_1, s_2), and with the only messages of the subset of messages.

It is observed that in all cases, the subscripts of the elements G of the second verification element of the signature s'_4 are different from n+1. All the elements necessary for the verification of the signatures are therefore present in the public key Kp.

It should be noted that in one exemplary embodiment where the value of the scalar t is set to 0, the signature system guarantees the authenticity of the signed messages but loses its properties of anonymity. This exemplary embodiment is therefore particularly indicated in a context where the property of anonymity is not desired.

In the exemplary embodiment described here, in step E12-4 of deriving a second verification element, the partial signature derivation entity 11 calculates, or derives, the second verification element s'_4. This second verification element s'_4 is intended to prove that the first verification element s'_3 is valid, that is to say well formed. Intuitively, the second verification element s'_4 allows showing that the first verification element s'_3, calculated from the concealed messages, is well formed, that is to say it cannot be used to cheat on the value of the messages $m_i$, for i in I, which are presented to the partial signature verification entity 12.

In a following sending sub-step E12-5, which constitutes the end of step E12 of generating a partial signature, the partial signature derivation entity 11 sends to the verification entity 12 the partial signature (s'_1, s'_2, s'_3, s'_4) and the subset of messages $m_i$, with i in I.

Thus, regardless of the number of messages of the subset of messages $m_i$, with i in I, regardless of the number of messages of the set of messages, the partial signature is of constant size and comprises few elements, in this case four. It is also noted that only the messages of the subset of messages {$m_i$}, with i in I, are transmitted. The verification entity 12 therefore does not need to know the set of messages {m_1, . . . , m_n} or of the messages that would be linked by construction to messages of the subset of messages, such as for example for the age, date of birth.

In a next receiving step E13, the partial signature verification entity 12 receives from the partial signature derivation entity 11 the subset of messages {$m_i$}, with i in I, and the generated partial signature (s'_1, s'_2, s'_3, s'_4).

The partial signature verification entity 12, in a prior step E14 of calculating the derived values, calculates:

$$c\_i = H(s'\_1 \| s'\_2 \| s'\_3 \| I \| i), \text{ for any subscript } i \text{ in } I$$

In a next signature verification step E15, the partial signature verification entity 12 tests whether the following two equations are met:

$$e(s'\_1, A^* (\Pi\_\{i \text{ in } I\} B\_i\hat{}\{m\_i\}))^* s'\_3) = e(s'\_2, h), \tag{1}$$

and $$e(\Pi\_\{i \text{ in } I\} G\_\{n+1-i\}\hat{}\{c\_i\}, s'\_3) = e(s'\_4, h), \tag{2}$$

If both equations are met (branch "ok" in FIG. 1), then the signature is considered as valid. Otherwise (branch "nok" in FIG. 1), it is rejected.

A signature obtained during the signature step E11 then derived during step E12 of deriving a partial signature is necessarily valid with regard to the signature verification step E15. Indeed:

$$e(s'\_1, A*(\Pi\_\{i \text{ in } I\}B\_i\hat{}\{m\_i\}) * s'\_3) = e(s\_1\hat{}r,$$
$$h\hat{}a*\Pi\_\{i \text{ in } I\}h\hat{}\{b\hat{}i*m\_i\}*\Pi\_\{j \text{ in } \{1, \ldots$$
$$n\}\backslash I\}h\hat{}\{b\hat{}j*m\_j\}*h\hat{}r) = e(s\_1\hat{}r, h\hat{}a*h\hat{}r*\Pi\{i \text{ in }$$
$$\{1, \ldots, n\}\}h\hat{}\{b\hat{}i*m\_i\}) \qquad (1)$$

And by noting that $$e(g\hat{}a, q) = e(g, q)\hat{}a = e(g, q\hat{}a):$$

$$= e(s\_1\hat{}\{r(t + a + b*m\_1 + b\hat{}2*m\_2 + \ldots + b\hat{}n*m\_n)\}, h)$$

$$= e(s'\_1\hat{}t*s\_1\hat{}\{r(a + b*m\_1 + b\hat{}2*m\_2 + \ldots + b\hat{}n*m\_n)\}, h)$$

$$= e(s'\_2, h)$$

The first equation (1) is therefore verified. Regarding the second equation:

$$e(\Pi\_\{i \text{ in } I\}G\_\{n+1-i\}\hat{}\{c\_i\}, s'\_3) = \qquad (2)$$

$$e(\Pi\_\{i \text{ in } I\}G\_\{n+1-i\}\hat{}\{c\_i\}, \Pi\_\{j \text{ in } \{1, \ldots, n\}\backslash I\}$$

$$B\_j\hat{}\{m\_j\}*h\hat{}t) = e((\Pi\_\{i \text{ in } I\}G\_\{n+1-i\}\hat{}\{c\_i\})\hat{}t +$$

$$\Sigma\{j \text{ in } \{1, \ldots, n\}\backslash I\}b\hat{}j*m\_j\}, h) = e(\Pi\_\{i \text{ in } I\}$$

$$(G\_\{n+1-i\}\hat{}t*G\_\{n+1-i\}\hat{}\{\Sigma\{j \text{ in } \{1, \ldots, n\}\backslash I\}b\hat{}j*m\_j\})\hat{}c\_i, h). \qquad 30$$

Il suffice to notice that $(G\_u)\hat{}\{b\hat{}v\}=g\hat{}\{b\hat{}\{u+v\}\}=G\_\{u+v\}$ for all integer u and v.

Thus, the previous coupling can be written:

$$e(\Pi\_\{i \text{ in } I\}(G\_\{n+1-i\}\hat{}r*\Pi\_\{j \text{ in }$$
$$\{1, \ldots, n\}\backslash\}G\_\{n+1-i+j\}\hat{}m\_j\})\hat{}\{c\_i\}, h) = e$$
$$(s'\_4, h)$$

The second verification equation is therefore verified.

In one exemplary embodiment (not represented in FIG. 1) where the signature verification, implemented by the partial signature verification entity 12 during the prior step E14 of calculating the derived values and the signature verification step E15 would be implemented directly on non-partial signatures, that is to say on signatures obtained at the end of the signature step E11, the first and second verification values s'_3, s'_4 are then set to 1 and I={1, . . . , n}.

The partial signature derivation method and the associated verification method, are of interest for all use cases requiring authentication, whether anonymous or not. More specifically, they apply in cases where several data are certified but where it is common to need to verify the authenticity of only some of them.

In a first example of use, a database potentially containing millions of data is certified. When a person wishes to retrieve a data from this database, they only need to verify the authenticity of this data. With a classic signature system, they would have to retrieve the entire database to perform this verification. With the mechanism described in PKC 2020, the signature would be short and the verification efficient, but the public key would contain trillions of elements. With the partial signature derivation method and the associated verification method described here, the same advantages would be kept but with a much shorter public key. The transmission of the public key and its storage by this person are much more efficient, while maintaining undeniable security properties.

The methods for deriving and verifying a partial signature described above are particularly suitable for use in the anonymous attestations or credentials. An anonymous attestation allows proving a property or a right related to its holder, without revealing the identity of the latter. It protects the privacy of the holder of the anonymous credential by providing the anonymity and non-traceability property. It takes the form here of cryptographic data: the partial signature, which can be shown by its holder, here the partial signature derivation entity 11, to an organization, here the partial signature verification entity 12, to prove a property related to their identity.

A partial signature derivation entity, according to one exemplary embodiment, will now be described in relation to FIG. 2. The partial signature derivation entity 11 is a computing piece of equipment, such as a computer.

The partial signature derivation entity 11 comprises:

a processing unit or processor 110, or CPU (Central Processing Unit), intended to load instructions into memory, to execute them, to perform operations;

a set of memories, including a volatile memory 111, or RAM (Random Access Memory) used to execute code instructions, store variables, etc., and a storage memory 112 of the EEPROM (Electrically Erasable Programmable Read Only Memory) type. Particularly, the storage memory 112 is arranged to memorize a software module for deriving a partial signature which comprises code instructions for implementing the steps of the partial signature derivation method as described previously and which are implemented by the partial signature derivation entity 11. The storage memory 112 is also arranged to memorize in a secure area the secret key Ks of the signature scheme.

The partial signature derivation entity 11 also comprises:

a receiving module 113 adapted to receive the set of messages {m_1, . . . , m_n} and a signature of said set of messages, said signature comprising signature elements (s_1, s_2) of the set of messages. The receiving module 113 is arranged to implement the step E12-1 of the partial signature derivation method as described previously;

a first generation module 114, arranged to generate anonymized elements of the signature (s'_1, s'_2). The first generation module 114 is arranged to implement the step E12-2 of generating the anonymized elements of the signature of the partial signature derivation method as described previously;

a second generation module 115, arranged to generate a first verification element s'_3 calculated from the messages other than those of the subset of messages. The second generation module 114 is arranged to implement the step E12-3 of generating a first verification element of the partial signature derivation method as described previously;

a third generation module 116, arranged to generate a second verification element s'_4 intended to prove that the first verification element is well formed. The third generation module 116 is adapted to implement the step E12-4 of generating a second verification element of the partial signature derivation method as described previously; and a sending module 117, arranged to send to a verification entity 12 a partial signature specific to the subset of messages. The partial signature comprises a constant number of elements: at least the elements of the signature of the set of anonymized messages (s'_1, s'_2), the first verification element s'_3 and the second verification element s'_4. The partial signature is intended to be verified with the only messages of the subset of messages. The second verification element s'_4 is a function of derived values calculated from at least the other elements of the signature. The sending module 117 is adapted to implement the sending sub-step E12-5 of the step E12 of deriving a partial signature of the partial signature derivation method as described previously.

The receiving module 113, the first generating module 114, the second generating module 115, the third generating module 116 and the sending module 117 are preferably software modules comprising software instructions for implementing those of the steps of the partial signature derivation method implemented by the partial signature derivation entity 11.

The invention therefore also concerns:

a computer program including instructions for the implementation of the steps of the partial signature derivation method as described above and implemented by the partial signature derivation entity when this program is executed by a processor of the partial signature derivation device, a readable recording medium on which the computer program described above is recorded.

A partial signature verification entity, according to one exemplary embodiment, will now be described in relation to FIG. 3. The partial signature verification entity 12 is a computing piece of equipment, such as a computer.

The partial signature verification entity 12 comprises:

a processing unit or processor 120, or CPU, intended to load instructions into memory, to execute them, to perform operations;

a set of memories, including a volatile memory 121, or RAM used to execute code instructions, store variables, etc., and a storage memory 122 of the EEPROM type. Particularly, the storage memory 122 is arranged to memorize a software module for verifying a partial signature as generated by the partial signature derivation entity 11. The software module comprises code instructions for implementing the steps of the partial signature verification method as described above and which are implemented by the partial signature verification entity 12. The storage memory 122 is also arranged to memorize in a storage area the public key Kp of the signature scheme.

The partial signature verification entity 12 also comprises:

a receiving module 123, arranged to receive the subset of messages and a partial signature (s'_1, s'_2, s'_3, s'_4) specific to the subset of messages. Said partial signature comprises a constant number of elements: at least the anonymized elements of the signature of the set of messages (s'_1, s'_2), a first verification element s'_3 calculated from the messages of the set other than those of the subset of messages and a second verification element s'_4 intended to prove that the first verification element is well formed. The second verification element s'_4 is a function of derived values from at least the other elements of the partial signature. The first receiving module is adapted to implement the step E14 of receiving the partial signature derivation method as described previously;

a calculation module 124, arranged to calculate derived values by means of a function of calculating derived values. The calculation module 124 is adapted to implement the step E14 of calculating the derived values of the partial signature derivation method as described previously;

a verification module 125, arranged to verify a first equation and a second equation. The first equation comprises the messages of the subset of messages, the elements of the signature of the set of messages, the first verification element and elements of the public key. The second equation comprises the first signature verification element, the second signature verification element, elements of the public key and derived values. The verification module 125 is arranged to implement the verification step E15 of the partial signature derivation method as described previously.

The receiving module 123, the calculation module 124 and the verification module 125 are preferably software modules comprising software instructions for implementing those of the steps of the partial signature derivation method implemented by the partial signature verification entity 12.

The invention therefore also concerns:

a computer program including instructions for implementing the steps of the partial signature derivation method as described above and implemented by the partial signature verification entity when this program is executed by a processor of the partial signature verification device 12, a readable recording medium on which the computer program described above is recorded.

The invention also relates to a partial signature derivation and verification system which comprises:

a partial signature derivation entity 11 as described above, and a partial signature verification entity 12 as described previously.

Although the present disclosure has been described with reference to one or more examples, workers skilled in the art will recognize that changes may be made in form and detail without departing from the scope of the disclosure and/or the appended claims.

The invention claimed is:

1. A method comprising:

deriving a partial signature for a subset I of a set of n messages, called first subset of messages, the number of messages of the first subset I being strictly smaller than n, said partial signature proving validity of a signature of the set of messages for the messages of the first subset I of messages, said deriving, implemented by an entity for deriving a partial signature, comprising:

receiving the set of messages and a signature of said set of messages, said signature comprising signature elements of the set of messages, generating anonymized elements of the signature, generating a first verification element calculated from a second subset of messages of the set of n messages, the second subset of messages being composed of the messages of the set of n messages other than those of the first subset I of messages, and generating a second verification element to prove that the first verification element is well formed, and sending, to a verification entity, the partial signature specific to the first subset I of messages, said partial signature comprising a constant number of elements comprising at least the anonymized elements of the signature of the set of messages, the first verification element and the second verification element, said partial signature being verifiable with only the messages of the first subset I of messages, wherein the second verification element is a function of derived values calculated from at least the elements of the partial signature other than the second verification element.

2. The method according to claim 1, wherein, I is the first subset of the set of n messages $\{1, \ldots, n\}$, n designating a maximum number of messages that can be signed at a time, the set of messages being denoted $\{m\_1, \ldots, m\_n\}$, let m_i be the messages of the first subset of messages, i belonging to I, the calculation of the derived values, denoted c_i, of the second verification element comprises:

for any i of I, application of a function H taking as input any string of characters and returning a non-zero scalar, said function H being applied to the anonymized elements of the signature of the set of messages, to the first verification element, to the subset I and to i in order to calculate the derived values c_i.

3. The method according to claim 2 wherein the function H taking as input any string of characters and returning a non-zero scalar is a one-way function.

4. The method according to claim 1 comprising before-hand generating a secret key and an associated public key in a bilinear environment, said environment designating a first group G1, a second group G2 and a third group GT of order p, as well as a bilinear map, taking as input an element of the first group G1, an element of the second group G2 and with values in the third group GT, let g, respectively h, be an element of the first group G1, respectively of the second group G2, said generating comprising:

generating, by a signatory entity, two random scalars a and b, said random scalars forming the secret key of the signatory entity, and calculating by the signatory entity:

$$G\_i=g^{\{b\hat{\ }i\}}, \text{ for any } 1{\le}i{\le}n \text{ and } n+2{\le}i{\le}2n,$$

$$A=h\hat{\ }a, \text{ and}$$

$$B\_i=h^{\{b\hat{\ }i\}}, \text{ for any } 1{\le}i{\le}n,$$

wherein the public key is formed of g, h, G_i, A, and B_i and of the function of calculating the derived values.

5. The method according to claim 4, wherein the signature of the set $\{1, \ldots, n\}$ of messages $\{m\_1, \ldots, m\_n\}$, comprises selecting by the signatory entity of a random element s_1 of the first group G1, and calculating:

s_2=s_1^$\{a+b*m\_1+b\hat{\ }2*m\_2+ \ldots +b\hat{\ }n*m\_n\}$, said signature comprising the signature elements s_1, s_2, and being denoted (s_1, s_2).

6. The method according to claim 1, wherein the derivation of the partial signature for the first subset I of the set $\{1, \ldots, n\}$ of messages comprises:

calculation of the anonymized elements ((s'_1, s'_2)) of the signature, said calculation comprising:

generation of a first random scalar t and of a second non-zero scalar r, anonymization of the first signature element and calculation of s'_1=s_1^r, anonymization of the second signature element and calculation of s' 2=s_2^r*s'_1^t, generation of the first verification element s'_3=Π_{j in $\{1, \ldots, n\}$\I} B_j^{m_j}*h^t, and generation of the second verification element s'_4=Π_{i in I}(G_{n+1−i}^t*Π_{j in $\{1, \ldots, n\}$\} G_{n+1−i+j} ^m_j)^c_i, the partial signature then being (s'_1, s'_2, s'_3, s'_4).

7. The method according to claim 1, comprising implementing the method in an anonymous credential system.

8. The method according to claim 1, wherein both the first subset and the second subset of the set of n messages are non-empty and complementary.

9. A method comprising:

verifying a partial signature for a subset I of a set of n messages, called first subset of messages, the number of messages of the first subset I being strictly smaller than n, said partial signature being intended to prove validity of a signature of the set of messages for the messages of the first subset I of messages, said verifying, implemented by an entity for verifying a partial signature, comprising:

receiving the first subset I of messages and the partial signature) specific to the first subset I of messages, said partial signature comprising a constant number of elements comprising at least anonymized elements of the signature of the set of messages, a first verification element calculated from a second subset of messages of the set of n messages, the second subset of messages being composed of the messages of the set of n messages other than those of the first subset I of messages and a second verification element to prove that the first verification element is well formed, the second verification element being a function of derived values from at least the elements of the partial signature other than the second verification element, calculating the derived values by using a function for calculating derived values, and verifying a first equation and of a second equation, said first equation comprising the messages of the first subset I of messages, the anonymized elements of the signature of the set of messages, the first verification element and elements of the public key, the second equation comprising the first signature verification element, the second signature verification element, elements of the public key and the derived values.

10. The method according to claim 9, wherein a secret key and a public key have been previously generated in a bilinear environment for a signatory entity, said environment designating a first group G1, a second group G2 and a third group GT of order p, as well as a bilinear map e, taking as input an element of the first group G1, an element of the second group G2 and with values in the third group GT, let g, respectively h, be an element of the first group G1, respectively of the second group G2, said generation of the secret key and of the public key comprising:

generating, by the signatory entity, 2 random scalars a and b, said random scalars forming the secret key of the signatory entity, and n designating the maximum number of messages that can be signed at a time, calculating by the signatory entity:

$$G\_i=g^{\{b\hat{\ }i\}}, \text{ for any } 1{\le}i{\le}n \text{ and } n+2{\le}i{\le}2n,$$

$$A=h\hat{\ }a, \text{ and}$$

$$B\_i=h^{\{b\hat{\ }i\}}, \text{ for any } 1{\le}i{\le}n,$$

g, h, G_i, A, and B_i and the function of calculating derived values, denoted H, forming the public key, the verification of the partial signature, denoted (s'_1, s'_2, s'_3, s'_4), received by the verification entity comprising for the first subset I of the set $\{1, \ldots, n\}$, the set of messages being denoted $\{m\_1, \ldots, m\_n\}$, let m_i be the messages of the first subset I of messages:

calculating the derived values:

$$c\_i = H(s'\_1 \| s'\_2 \| s'\_3 \| I \| i), \text{ for any subscript } i \text{ in } I,$$

verification of the first equation:

$$e(s'\_1, A*(\Pi\_\{i \text{ in } I\} B\_i^{\{m\_i\}})*s'\_3) = e(s'\_2, h), \text{ and}$$
of the second equation:

$$e(\Pi\_\{i \text{ in } I\} G\_\{n+1-i\}^{\{c\_i\}}, s'\_3) = e(s'\_4, h).$$

11. The method according to claim 9, comprising implementing the method in an anonymous credential system.

12. A partial signature derivation entity comprising:
a processor; and
a non-transitory computer readable medium comprising instructions stored thereon which when executed by the processor configure the partial signature derivation entity to derive a partial signature for a subset I of a set of n messages, called first subset of messages, the number of messages of the first subset I being strictly smaller than n, said partial signature proving validity of a signature of the set of messages for the messages of the first subset I of messages, wherein the deriving comprises:
receiving the set of messages and a signature of said set of messages, said signature comprising signature elements of the set of messages,
generating anonymized elements of the signature,
generating a first verification element calculated from a second subset of messages of the set of messages, the second subset of messages being composed of the messages of the set of messages other than those of the first subset I of messages,
generating a second verification element intended to prove that the first verification element is well formed, and
sending to a verification entity the partial signature specific to the first subset I of messages, said partial signature comprising a constant number of elements comprising at least the anonymized elements of the signature of the set of messages, the first verification element and the second verification element, said partial signature being verifiable with only the messages from the first subset I of messages, wherein the second verification element is a function of derived values calculated from at least the elements of the partial signature other than the second verification element.

13. A partial signature verification entity comprising:
a processor; and
a non-transitory computer readable medium comprising instructions stored thereon which when executed by the processor configure the partial signature derivation entity to verify a partial signature for a subset I of a set of n messages, called first subset of messages, the number of messages of the first subset I being strictly smaller than n, said partial signature proving validity of a signature of the set of messages for the messages of the first subset I of messages, wherein the verifying comprises:
receiving the first subset I of messages and the partial signature specific to the first subset I of messages, said partial signature comprising a constant number of elements comprising at least anonymized elements of the signature of the set of messages, a first verification element calculated from a second subset of messages of the set of messages, the second subset of messages being composed of the messages of the set of messages other than those of the first subset I of messages and a second verification element intended to prove that the first verification element is well formed, the second verification element being a function of derived values from at least the elements of the partial signature other than the second verification element,
calculating derived values by using a function of calculating derived values, and
verifying a first equation and a second equation, said first equation comprising the messages of the first subset I of messages, the anonymized elements of the signature of the set of messages, the first verification element and elements of the public key, the second equation comprising the first signature verification element, the second signature verification element, elements of the public key and the derived values.

\* \* \* \* \*